(No Model.)
F. LAQUA.
HARVESTER.
No. 328,234. Patented Oct. 13, 1885.
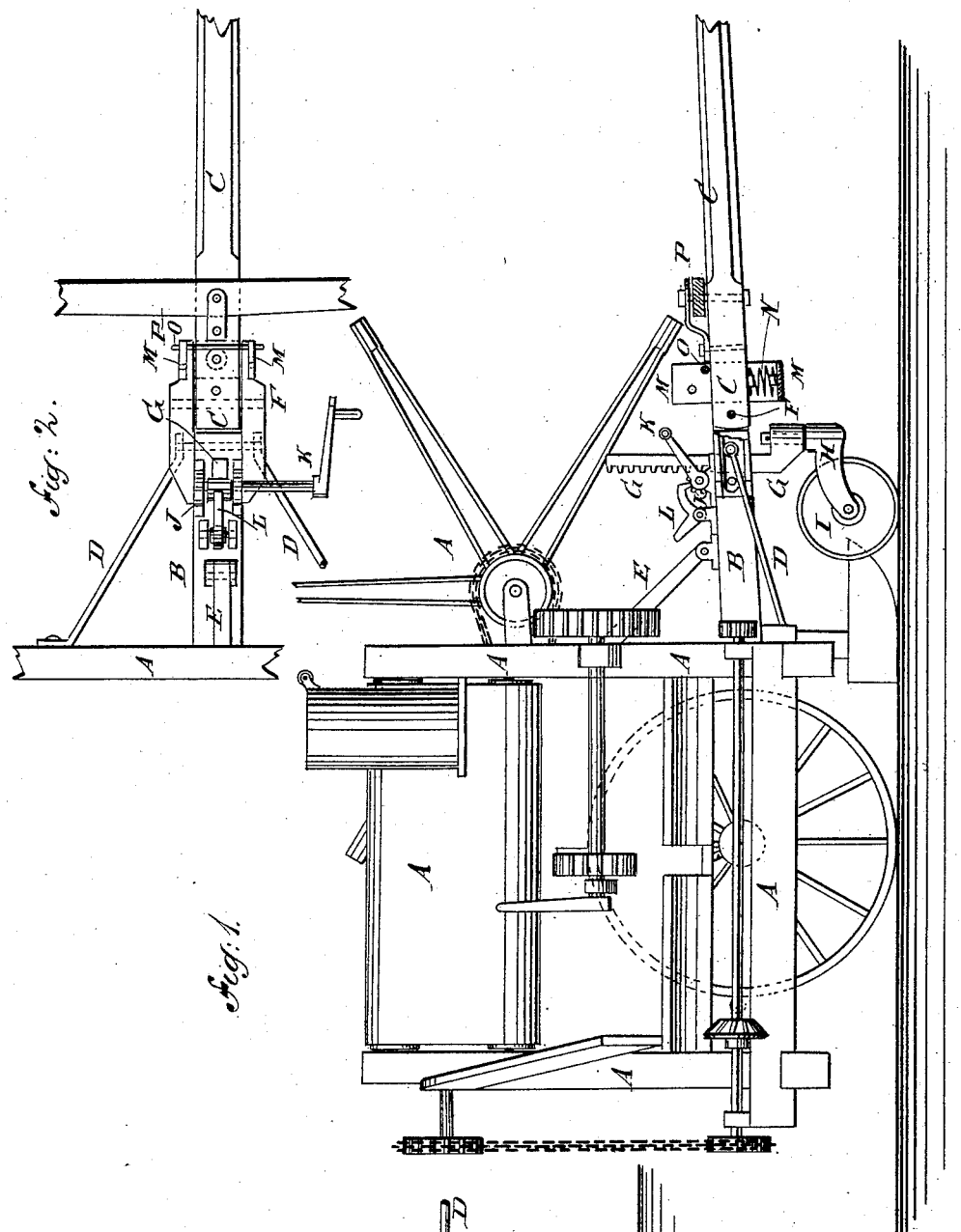
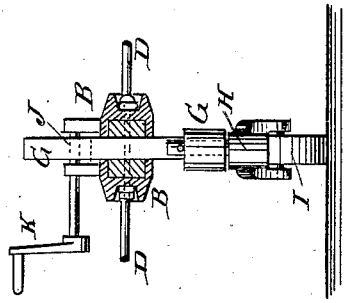
WITNESSES:
Chas. Nida
C. Sedgwick
INVENTOR:
F. Laqua
BY Munn & Co.
ATTORNEYS.

UNITED STATES PATENT OFFICE.

FREDERICK LAQUA, OF THIELMANTON, MINNESOTA.

HARVESTER.

SPECIFICATION forming part of Letters Patent No. 328,234, dated October 13, 1885.

Application filed November 26, 1884. Serial No. 148,909. (No model.)

*To all whom it may concern:*

Be it known that I, FREDERICK LAQUA, of Thielmanton, in the county of Wabasha and State of Minnesota, have invented a new and useful Improvement in Harvesters, of which the following is a full, clear, and exact description.

Reference is to be had to the accompanying drawings, forming a part of this specification, in which similar letters of reference indicate corresponding parts in all the figures.

Figure 1 is a side elevation of a part of a harvester to which my improvement has been applied. Fig. 2 is a plan view of a part of the same. Fig. 3 is a sectional front elevation of the improvement.

The special object of this invention is to make harvesters run steadier and easier than those constructed in the ordinary manner, and to take the weight off the horses' necks, and thus prevent their necks from being made sore.

The invention consists in the construction and arrangement of parts hereinafter described and claimed.

A represents a harvester. B C is the tongue, which is made in two parts or sections. The rear end of the rear section, B, of the tongue is rigidly attached to the frame of the harvester A, and is strengthened in position by the braces D, attached at their forward ends to the opposite sides of the forward end of the said section B. The section B is further secured in place by the brace E, the lower end of which is hinged to the middle part of the upper side of the said section B, and its upper end is secured to the forward part of the frame of the harvester A. The forward end of the section B is widened, and is slotted or has forwardly-projecting blocks attached to its sides, forming a slot to receive the rear end of the forward section, C, of the tongue, which is hinged in place by a pin or bolt, F.

In the forward part of the rear tongue-section, B, is formed a short slot to receive the upright bar G, to the lower end of which is pivoted the standard H of the caster-wheel I. Upon the rear side of the upright bar G are formed teeth to mesh into the small gear-wheel J, journaled to bearings formed upon or attached to the upper side of the rear tongue-section, B, so that the said tongue-section B can be raised and lowered to raise and lower the forward end of the harvester A by turning the said gear-wheel J. One of the journals of the gear-wheel J projects, and to it is attached a crank, K, for convenience in turning the said gear-wheel. The gear-wheel J is held in any position into which it may be adjusted by a pawl, L, pivoted to lugs formed upon or attached to the upper side of the rear tongue-section B.

To the opposite sides of the slotted forward end of the rear tongue-section, B, are attached the arms of a U-shaped plate, M, the bend of which is at a little distance below the rear end of the forward tongue-section, C. The U-plate M is placed a little in front of the hinging-bolt F of the tongue-sections, and its arms project a little above the said tongue-sections.

Between the bend of the U-plate M and the lower side of the rear end of the forward tongue-section, C, is interposed a spiral or other spring, N, to stiffen the joint between the tongue-sections and prevent the harvester from tipping over to the rearward when being drawn up hill. The upwardly-projecting arms of the U-plate M have one or more holes formed through them to receive a bolt or pin, O, to prevent the forward end of the harvester from dropping downward when crossing deep ditches and allowing the caster-wheel I to drop into such ditches so far as to strike against the side of said ditches and be broken.

The double-tree P is attached to the rear part of the forward tongue-section, C, as shown in Figs. 1 and 2.

Having thus described my invention, I claim as new and desire to secure by Letters Patent—

In a harvester, the combination, with the sections B C of the jointed tongue, of the U-plate M, the spring N, and the bolt or pin O, substantially as herein shown and described, whereby the forward end of the harvester will be kept from rising too high and from dropping too low, as set forth.

FREDERICK LAQUA.

Witnesses:
FRANK RIESTER,
JOSEPH LAQUA.